United States Patent
Wu et al.

(10) Patent No.: US 11,847,313 B2
(45) Date of Patent: Dec. 19, 2023

(54) ELECTRONIC DEVICE HAVING TOUCHPAD WITH OPERATING FUNCTIONS SELECTED BASED ON GESTURE COMMAND AND TOUCH METHOD THEREOF

(71) Applicant: ASUSTEK COMPUTER INC., Taipei (TW)

(72) Inventors: Jau-Yi Wu, Taipei (TW); Sheng-Ta Lin, Taipei (TW)

(73) Assignee: ASUSTEK COMPUTER INC, Taipei (TW)

( * ) Notice: Subject to any disclaimer, the term of this patent is extended or adjusted under 35 U.S.C. 154(b) by 185 days.

(21) Appl. No.: 17/410,204

(22) Filed: Aug. 24, 2021

(65) Prior Publication Data
US 2022/0066630 A1    Mar. 3, 2022

(30) Foreign Application Priority Data
Sep. 3, 2020    (TW) ................................. 109130127

(51) Int. Cl.
| G06F 3/04883 | (2022.01) |
| G06F 3/0484 | (2022.01) |
| G06F 1/16 | (2006.01) |

(52) U.S. Cl.
CPC .......... *G06F 3/04883* (2013.01); *G06F 1/169* (2013.01); *G06F 3/0484* (2013.01)

(58) Field of Classification Search
CPC .... G06F 3/04883; G06F 1/169; G06F 3/0484; G06F 2203/04806; G06F 3/03547; G06F 3/0482; G06F 3/0485
See application file for complete search history.

(56) References Cited

U.S. PATENT DOCUMENTS

| 7,561,146 B1 * | 7/2009 | Hotelling ................ G06F 3/038 |
| | | 345/173 |
| 2010/0328236 A1 * | 12/2010 | Ma ...................... G06F 3/04886 |
| | | 345/173 |

(Continued)

FOREIGN PATENT DOCUMENTS

| CN | 103777850 A | 5/2014 |
| TW | 200910167 A | 3/2009 |
| TW | M416137 U | 11/2011 |

*Primary Examiner* — Rodney Amadiz
(74) *Attorney, Agent, or Firm* — MUNCY, GEISSLER, OLDS & LOWE, P.C.

(57) ABSTRACT

A touch method applied to an electronic device is provided. The electronic device includes a touchpad and a screen, the touchpad has a plurality of operating functions. The touch method includes: receiving an input gesture through the touchpad; determining whether the input gesture matches with a preset gesture command or not; maintaining an original setting of the touchpad, in response to the input gesture does not match with the preset gesture command; dividing the touchpad into a non-dominant hand operating area and a dominant hand operating area in response to the input gesture matches with the preset gesture command, and after receiving a selecting command in the non-dominant hand operating area, selecting one of the operating functions according to the selecting command; and executing selected the operating function in the dominant hand operation area. An electronic device for executing the touch method is also provided.

15 Claims, 6 Drawing Sheets

(56) References Cited

U.S. PATENT DOCUMENTS

| | | | |
|---|---|---|---|
| 2011/0175825 A1 | 7/2011 | Chen et al. | |
| 2012/0127085 A1* | 5/2012 | Stewart | G06F 3/038 345/173 |
| 2012/0212424 A1* | 8/2012 | Sharma | G06F 3/0416 345/173 |
| 2014/0298275 A1* | 10/2014 | Popov | G06F 3/017 715/863 |
| 2015/0067561 A1* | 3/2015 | Suzuki | G06F 3/03547 715/767 |
| 2015/0091803 A1* | 4/2015 | Wang | G06F 3/04166 345/163 |
| 2015/0309635 A1* | 10/2015 | Shih | G06F 3/0393 345/173 |
| 2016/0048288 A1* | 2/2016 | Lee | G06F 3/04883 455/566 |
| 2018/0173414 A1* | 6/2018 | Gong | G06F 3/03547 |
| 2019/0065045 A1* | 2/2019 | Gong | G06F 3/04892 |
| 2019/0138120 A1 | 5/2019 | Li | |

\* cited by examiner

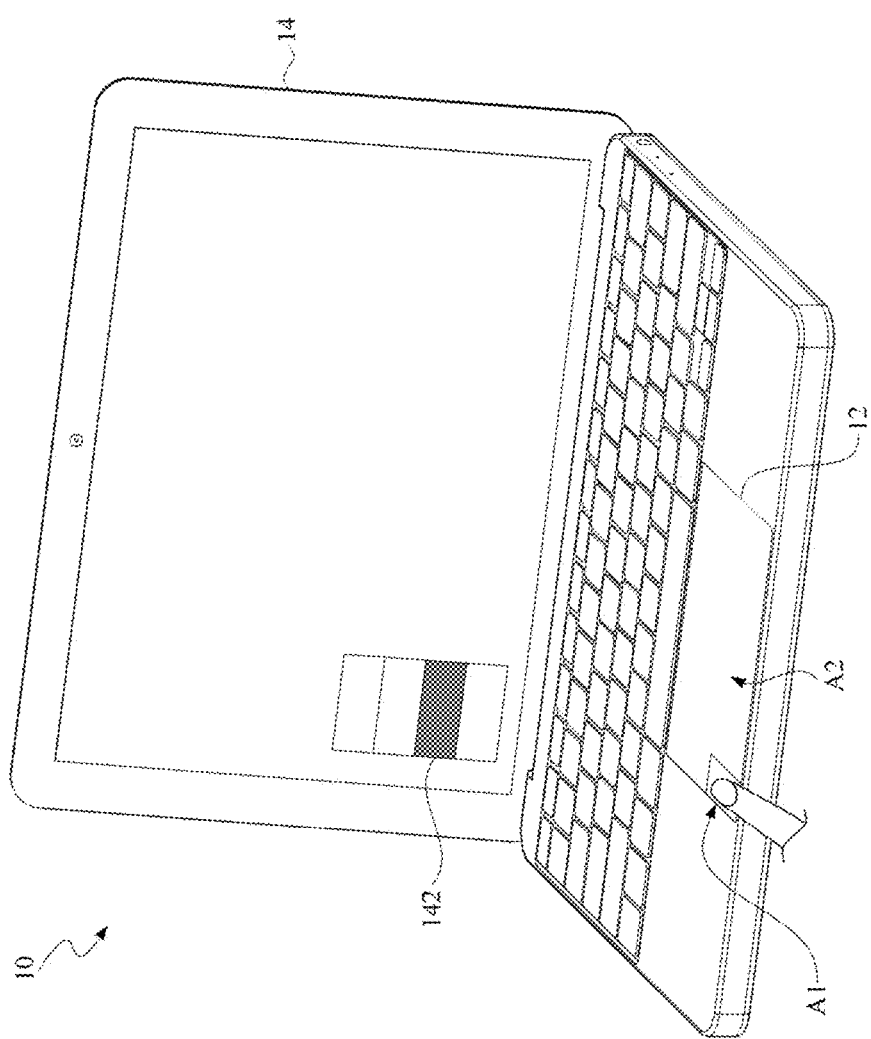

ELECTRONIC DEVICE HAVING TOUCHPAD WITH OPERATING FUNCTIONS SELECTED BASED ON GESTURE COMMAND AND TOUCH METHOD THEREOF

CROSS-REFERENCE TO RELATED APPLICATION

This application claims the priority benefit of Taiwan application serial No. 109130127, filed on Sep. 3, 2020. The entirety of the above-mentioned patent application is hereby incorporated by reference herein and made a part of specification.

BACKGROUND OF THE INVENTION

Field of the Invention

The invention relates to a touch method, especially relative to a touch method of an electronic device.

Description of the Related Art

A touchpad is a commonly used indicator input device. Compared with a mouse, the touchpad is integrated into a notebook to facilitate portability. Many current notebooks are equipped with touchpads that supports multi-touch functions to provide more operating options. However, in order to provide a mouse-like function on the touchpad, complicated gestures needs to be set and memorized, which makes the operation of the touchpad difficult and it is inconvenient for the users.

BRIEF SUMMARY OF THE INVENTION

A touch method applied to an electronic device is provided herein. The electronic device includes a touchpad and a screen, the touchpad includes a plurality of operating functions. The touch method includes the following steps: receiving an input gesture through the touchpad; determining whether the input gesture matches with a preset gesture command or not; maintaining the original setting of the touchpad, in response to the input gesture does not match with the preset gesture command; dividing a non-dominant hand operating area and a dominant hand operating area on the touchpad, in response to the input gesture matches with the preset gesture command, and after receiving a selecting command in the non-dominant hand operating area, selecting one of the operating functions according to the selecting command; and executing the selected operating function in the dominant hand operation area.

An electronic device is also provided herein. The electronic device includes a touchpad, a screen and a control unit. The touchpad includes a plurality of operating functions. The control unit is electrically connected to the touchpad and the screen. The control unit is used for: receiving an input gesture through the touchpad; determining whether the input gesture matches with a preset gesture command or not; maintaining the original setting of the touchpad, in response to the input gesture does not match with the preset gesture command; dividing a non-dominant hand operating area and a dominant hand operating area on the touchpad, in response to the input gesture matches with the preset gesture command, and after receiving a selecting command in the non-dominant hand operating area, selecting one of the operating functions according to the selecting command; and executing the selected operating function in the dominant hand operation area.

The electronic device and the touch method provide an operation mode that similar to the mouse interface to instead the operation mode on the touchpad, which is convenient for the users, and further provides the users with better experience.

BRIEF DESCRIPTION OF THE DRAWINGS

FIG. 3A to 3D are schematic diagrams of the operation of the electronic device according to the touch method in FIG. 2.

DETAILED DESCRIPTION OF THE EMBODIMENTS

Specific embodiments of the disclosure will be described in further detail below with reference to schematic drawings. The advantages and features of the disclosure will become more apparent from the following description and claims. It is to be noted that the drawings are all in a very simplified form and are not drawn to accurate scale, but are merely used for convenience and clarity of description of the embodiments of the disclosure.

Figure 1:
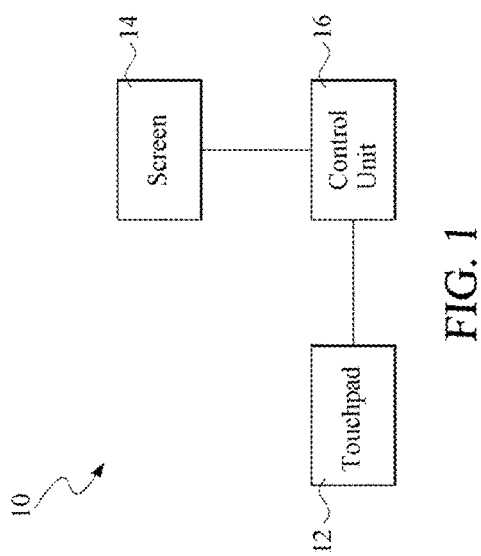
FIG. 1 is a block diagram of an electronic device according to an embodiment.
Figure 2:
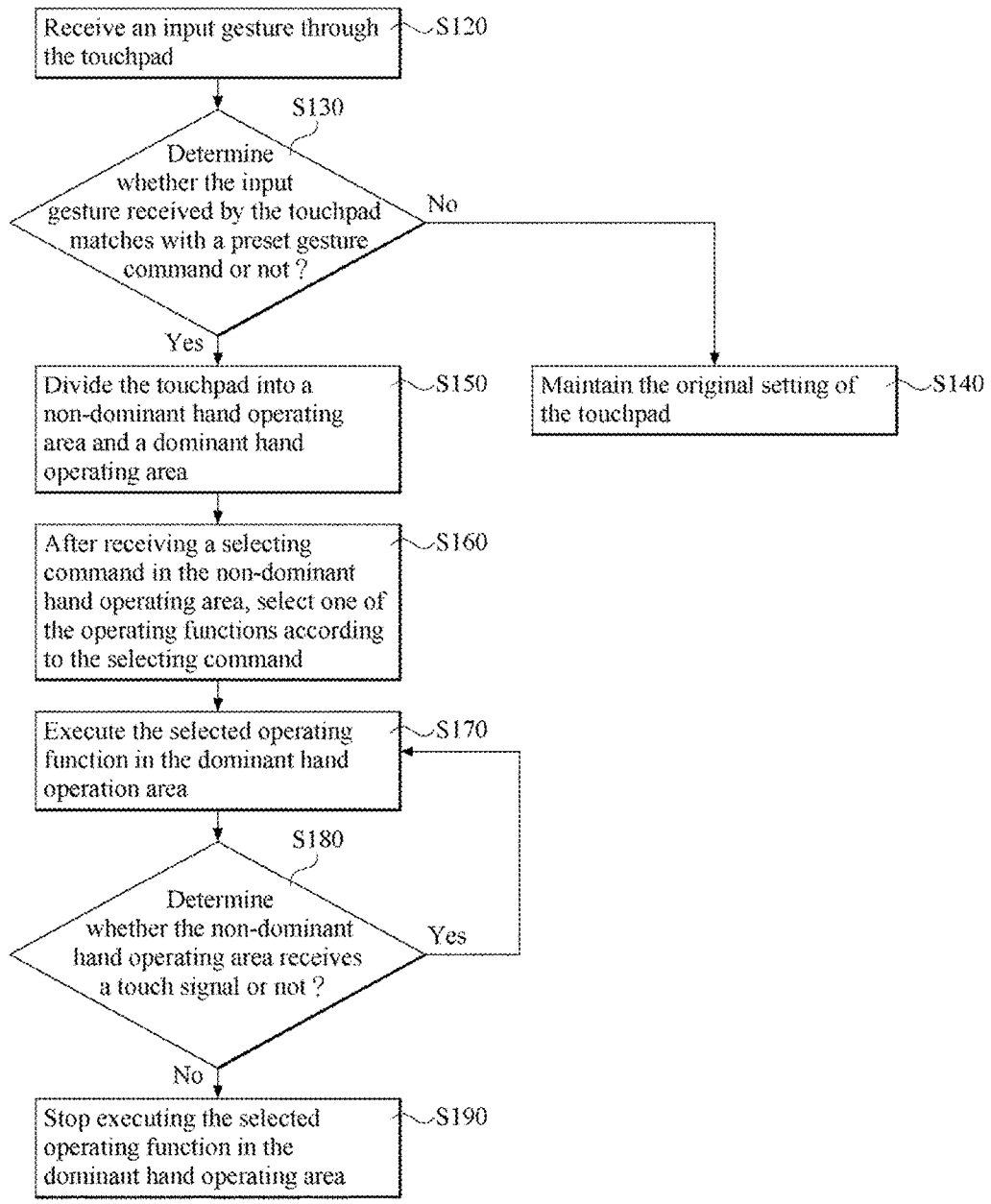
FIG. 2 is a flowchart of a touch method according to an embodiment.

FIG. 1 is a block diagram of an embodiment of an electronic device. FIG. 2 is a flowchart of a touch method according to an embodiment. FIG. 3A to 3D are schematic diagrams of the operation of the electronic device according to the touch method in FIG. 2. In one embodiment, the electronic device 10 is a notebook, which is not limited herein.

As shown in FIG. 1, the electronic device 10 includes a touchpad 12, a screen 14 and a control unit 16. The touchpad 12 includes a plurality of operating functions. Regarding to the operating functions, in addition to the original setting functions of the touchpad, such as cursor movement and click selection, in one embodiment, the operating functions further include right-click menu, scrolling, zooming and dragging. In one embodiment, the touchpad 12 is a multi-touch touchpad that supports operating functions above.

The control unit 16 is electrically connected to the touchpad 12 and the screen 14, to control the touchpad 12 and the screen 14. In one embodiment, the control unit 16 includes a touch control chip, a screen control chip and a central processing unit. The central processing unit receives the touch information from the touchpad 12 through the touch control chip for processing, and controls the screen 14 to display through the screen control chip, which is not limited herein.

Please refer to FIG. 2, the touch method includes the following steps.

As shown in step S120, firstly, an input gesture is received through the touchpad 12.

Subsequently, as shown in step S130, it is determined whether the input gesture received by the touchpad 12 matches with a preset gesture command or not. In one embodiment, the preset gesture command is a non-dominant hand gesture command. Taking the left hand as the non-dominant hand as an example, in one embodiment, the non-dominant hand gesture instruction is a gesture instruction sensed by the left area of the touchpad 12.

In one embodiment, the non-dominant hand gesture instruction is a gesture instruction of sliding right or up. Step S120 is performed by the control unit 16 in FIG. 1.

As shown in step S140, in response to the input gesture received by the touchpad 12 does not match with the preset gesture command, the touchpad 12 maintains the original setting. In one embodiment, the original setting of the touchpad 12 defines that the touchpad 12 is a single complete touch area, and the operating function that the touchpad 12 performs is only the cursor movement and click selection, which is not limited herein. Step S140 is performed by the control unit 16 in FIG. 2.

As shown in step S150, when the input gesture received by the touchpad 12 matches with the preset gesture command, the touchpad is divided into a non-dominant hand operating area and a dominant hand operating area. Please refer to FIG. 3A. The area located at the left bottom of the touchpad 12 is the non-dominant hand operating area A1, and the other area is the dominant hand operating area A2.

In one embodiment, in order to prevent the operation in the non-dominant hand operating area A1 from affecting the operation in the dominant hand operating area A2, the range of the non-dominant hand operating area A1 is smaller than the range of the dominant hand operating area A2.

In one embodiment, since most of the user's non-dominant hand is the left hand, the non-dominant hand operating area A1 is set on the left side of the touchpad 12, which is not limited herein.

In one embodiment, the non-dominant hand operating area is set on the right side of the touchpad depending on the user's operating habit.

In one embodiment, the non-dominant hand operating area A1 is defined at a corner of the touchpad 12, to avoid affecting the operation of the dominant hand operating area A2. Step S150 is executed by the control unit 16 in FIG. 2.

Subsequently, in response to the input gesture received by the touchpad 12 matches with the preset gesture command, as shown in step S160, and after receiving a selecting command, one of the operating functions is selected according to the selecting command. That is, the selected operating function is executed in the dominant hand operating area A2.

Figure 3A:
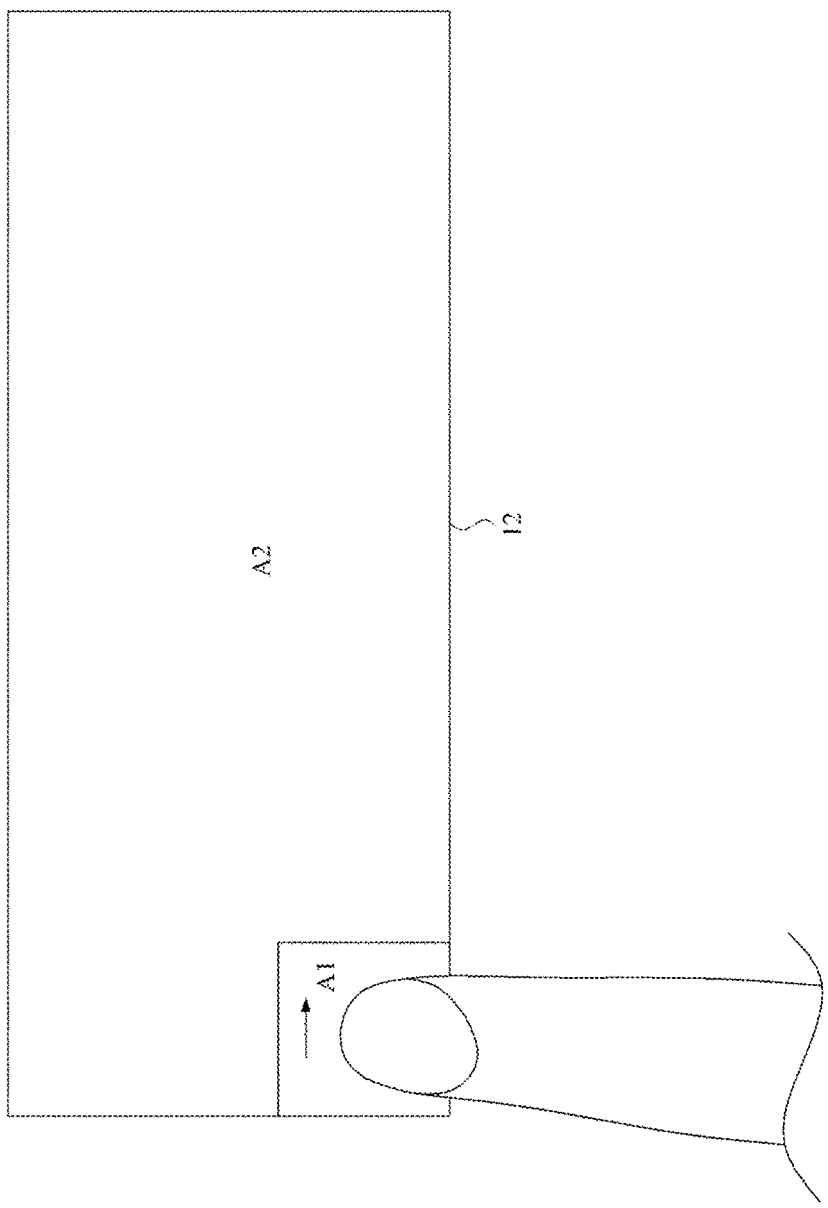
Figure 3B:
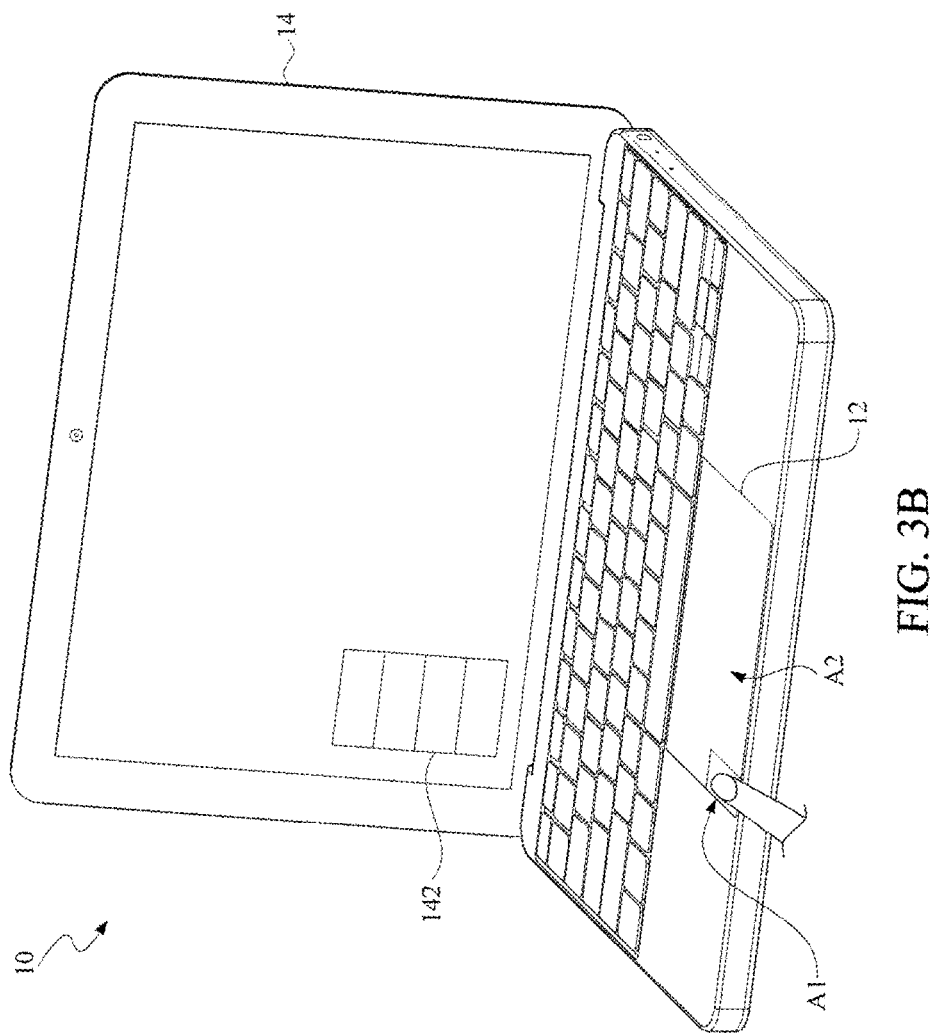
Figure 3D:
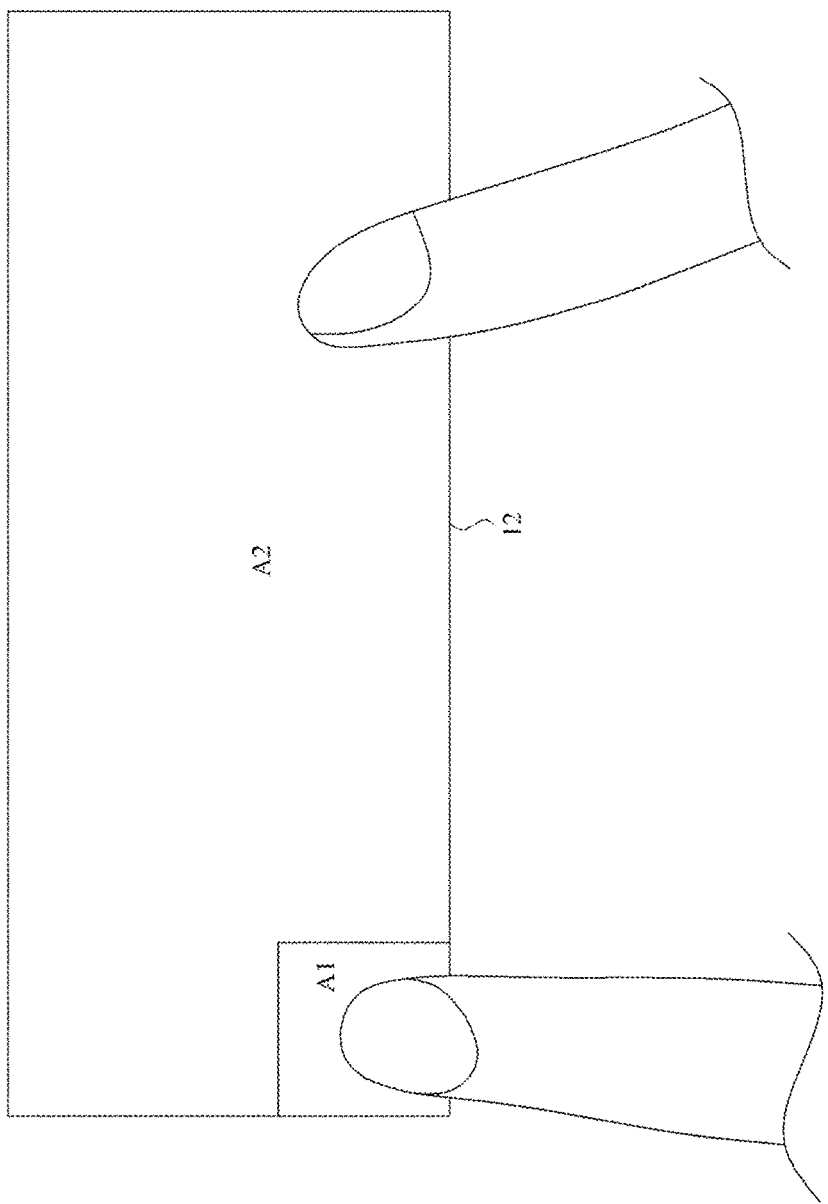

In one embodiment, please refer to FIG. 3B. The touch method defines the non-dominant hand operating area A1 and the dominant hand operating area A2 on the touchpad 12, and also displays a function menu 142 on the screen 14 to show a variety of operation functions for the user. Then, the user chooses the operating function to be executed in the dominant hand operating area A2. For example, as shown in the figure, the optional operating functions include right-click menu, scrolling, zooming and dragging, which is not limited herein.

In one embodiment, when the function menu 142 is displayed on the screen 14, a sliding selection function is executed in the non-dominant hand operating area A1, to facilitate the user to input the selecting command. Please refer to FIG. 3C. In one embodiment, the selected operating function is marked by highlighting or other ways in the function menu 142. Step S160 is executed by the control unit in FIG. 2.

Subsequently, as shown in step S170, the selected operating function in step S160 is executed in the dominant hand operating area A2.

Next, as shown in step S180, determine whether the non-dominant hand operating area A1 receives a touch signal or not. Please refer to FIG. 3D. When the non-dominant hand operating area A1 receives the touch signal, the process returns to step S170, and continuously executes the selected operating function in step S160 in the dominant hand operating area A2.

When the non-dominant hand operating area A1 does not receive the touch signal, the process proceeds to step S190 to stop executing the selected operating function in the dominant hand operating area A2. In one embodiment, when the dominant hand operating area A2 stops executing the selected operating function, it switches the touchpad 12 to the original setting.

The foregoing embodiments are based on whether the non-dominant hand operating area A1 receives a touch signal and further to determine whether the dominant hand operating area A2 continuously performs the selected operating function or not. In other words, after selecting the operating function by the dominant hand operating area A2, as long as it is determined that the user continuously touches the non-dominant hand operating area A1, the selected operating function is continuously executed in the dominant hand operating area A2.

In one embodiment, when the user removes the non-dominant hand from the non-dominant hand operating area, the selected operating function stops performing in the dominant hand operating area A2, which is not limited herein.

Regarding to the aforementioned control of the executed operating function in the dominant hand operating area A2, a preset executing time is provided, and the operating function automatically stops at the end of the preset executing time, or a preset gesture of the non-dominant hand is used to control the dominant hand operation area A2 to stop executing the selected operating function.

The electronic device 10 and the touch method provide an operation mode that similar to the mouse interface, which instead of the traditional operation mode on the touch panel 12. It is convenient for the user, and provides the user with better experience.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A touch method, applied to an electronic device, the electronic device includes a touchpad and a screen, and the touchpad includes a plurality of operating functions, the touch method comprising:
   receiving an input gesture through the touchpad;
   determining whether the input gesture matches with a preset gesture command or not;
   maintaining an original setting of the touchpad, in response to the input gesture does not match with the preset gesture command;
   dividing the touchpad into a non-dominant hand operating area and a dominant hand operating area in response to the input gesture matches with the preset gesture command, and after receiving a selecting command in the non-dominant hand operating area, selecting one of the operating functions according to the selecting command; and
   executing the selected operating function in the dominant hand operation area.

2. The touch method according to claim 1, wherein the operating functions include right-click menu, scrolling, zooming and dragging.

3. The touch method according to claim 1, wherein the touch method further comprises a step of displaying a function menu on the screen to show the operating functions in response to the input gesture matches with the preset gesture command.

4. The touch method according to claim 3, wherein the step of selecting one of the operating functions according to the selecting command after receiving the selecting command in the non-dominant hand operating area further comprises a step of marking the selected operating function in the function menu.

5. The touch method according to claim 1, wherein the preset gesture command is a non-dominant hand gesture command.

6. The touch method according to claim 1, wherein after the step of executing the selected operating function in the dominant hand operation area, the touch method further comprises:
   stopping executing the selected operating function in the dominant hand operating area when the non-dominant hand operating area does not receive a touch signal.

7. The touch method according to claim 1, wherein a range of the non-dominant hand operating area is smaller than a range of the dominant hand operating area.

8. The touch method according to claim 1, wherein the non-dominant hand operating area is defined at a corner of the touchpad.

9. An electronic device, comprising:
   a touchpad, having a plurality of operating functions;
   a screen; and
   a control unit, electrically connected to the touchpad and the screen, wherein the control unit is configured to:
   receiving an input gesture through the touchpad;
   determining whether the input gesture matches with a preset gesture command or not;
   maintaining an original setting of the touchpad, in response to the input gesture does not match with the preset gesture command;
   dividing the touchpad into a non-dominant hand operating area and a dominant hand operating area, in response to the input gesture matches with the preset gesture command, and after receiving a selecting command in the non-dominant hand operating area, selecting one of the operating functions according to the selecting command; and
   executing the selected operating function in the dominant hand operation area.

10. The electronic device according to claim 9, wherein, the operating functions include right-click menu, scrolling, zooming and dragging.

11. The electronic device according to claim 9, wherein, in response to the input gesture matches with the preset gesture command, the control unit further controls the screen to display a function menu to show the operating functions.

12. The electronic device according to claim 9, wherein, the preset gesture command is a non-dominant hand gesture command.

13. The electronic device according to claim 9, wherein the control unit is further configured to stop executing the selected operating function in the dominant hand operating area when the non-dominant hand operating area does not receive a touch signal.

14. The electronic device according to claim 9, wherein a range of the non-dominant hand operating area is smaller than a range of the dominant hand operating area.

15. The electronic device according to claim 9, wherein the non-dominant hand operating area is defined at a corner of the touchpad.

* * * * *